United States Patent [19]
Meiberg

[11] 3,759,167
[45] Sept. 18, 1973

[54] DOUGH TREATING MACHINE

[76] Inventor: Abner Meiberg, 8 Borohov St., Givatayim, Israel

[22] Filed: June 19, 1972

[21] Appl. No.: 264,265

[30] Foreign Application Priority Data
Oct. 14, 1971 Israel..............................37,928

[52] U.S. Cl. ................................ 99/485
[51] Int. Cl.............................. A21d 8/00
[58] Field of Search..................... 99/233.9, 233.11, 99/485, 646; 101/41, 287; 259/190, 185

[56] References Cited
UNITED STATES PATENTS
| 667,589 | 2/1901 | Silverman | 101/41 |
| 2,193,147 | 3/1940 | Stricker | 99/485 |
| 3,403,640 | 10/1968 | Schroder | 259/185 |
| 3,530,792 | 9/1970 | Valiela | 101/41 |

Primary Examiner—Robert W. Jenkins
Attorney—Benjamin J. Barish

[57] ABSTRACT

Apparatus for producing bread loaves and buns having a plaited appearance comprises a table for receiving the lumps of dough for baking, and a forming device overlying the table. The forming device includes a plurality of forming members for simulating plaits on the lumps of dough, and advancing and retracting means for actuating such members. In one described embodiment the lumps of dough are manually fed to the forming device, and in a second described embodiment, they are fed by an automatically controlled conveyor.

7 Claims, 7 Drawing Figures

PATENTED SEP 18 1973 3,759,167
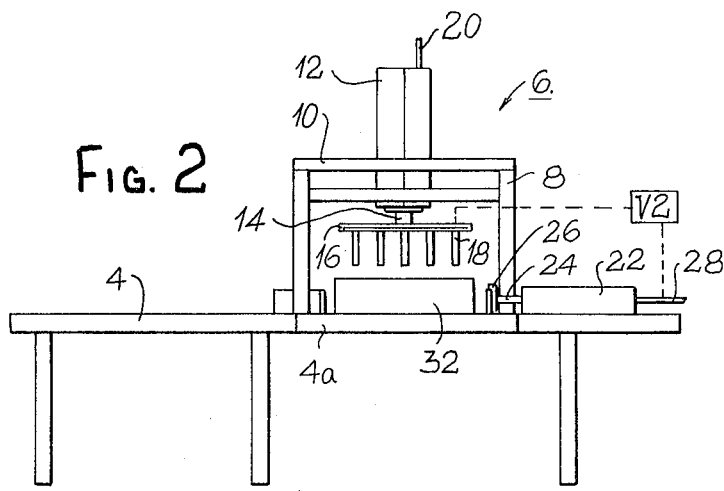
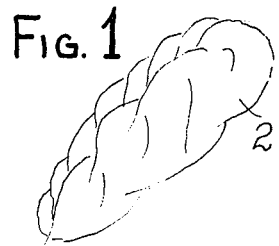
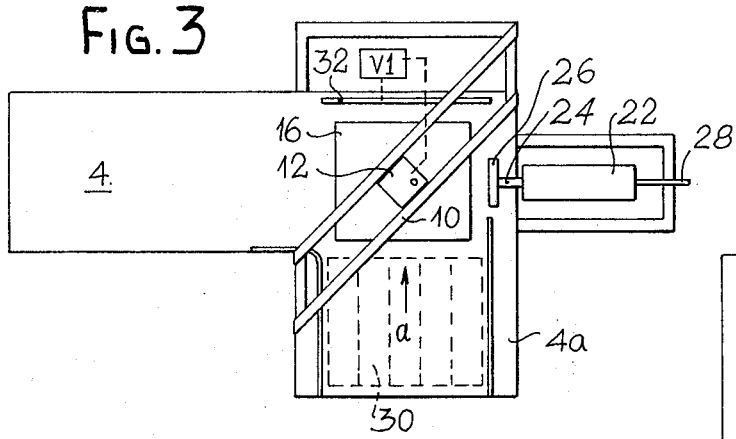
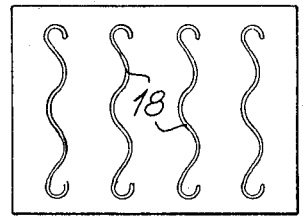
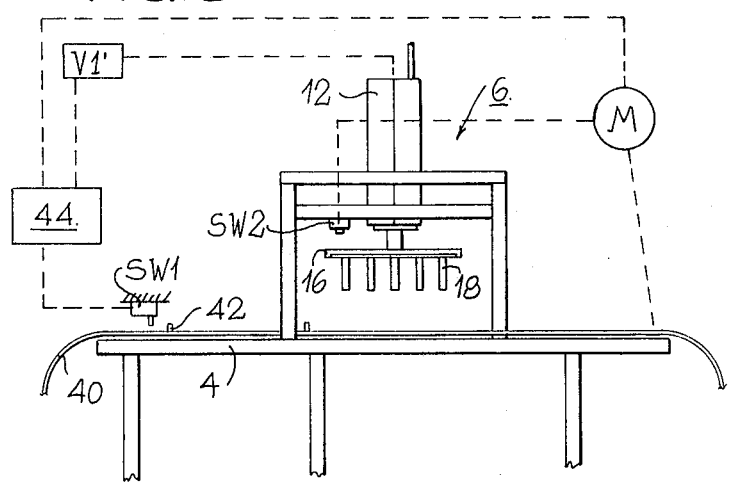
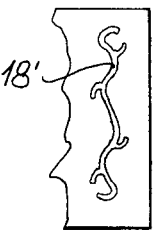

DOUGH TREATING MACHINE

BACKGROUND OF THE INVENTION

The present invention relates to dough forming machines for use in making bread and particularly to apparatus for producing dough loaves and buns having a plaited appearance.

Certain types of loaves or buns are made by plaiting or twisting strips of dough around each other. This is usually done by forming an elongated strip of dough and then twisting it about itself, but sometimes two distinct strips are twisted together to form the plaiting. The so-prepared dough is placed in a pan or tray, usually of sheet metal, and introduced into the oven where it is baked.

This method has a number of disadvantages. First, the manual forming and twisting of the plaited dough is time-consuming and costly. In addition, the baked articles produced by this technique tend to come apart. This is because the dough, when in strip form, forms an outer skin which is somewhat drier and harder than its interior; when that strip is twisted upon itself, or with another strip, the contacting faces do not unite homogeneously because of the hardened skin, with the result that after baking, there is a tendency for the united parts to break away when the loaf is cut.

BRIEF SUMMARY OF THE INVENTION

According to the invention, there is provided apparatus which includes a table for receiving the lumps of dough before they are baked into loaves or buns, and a forming device overlying the table. The forming device comprises a plurality of forming members for simulating plaits on the lumps of dough. The forming device further includes advancing means and retracting means for actuating the forming members.

According to one described embodiment, the dough is manually fed, the forming device being automatically actuated when the dough is placed in the forming position on the table. In another described embodiment, the dough is fed by a conveyor, the apparatus including control means for automatically controlling the conveyor and also the forming device.

It will be seen that the apparatus of the present invention permits the production of plaited bread loaves in a more efficient and inexpensive manner, and moreover, the baked articles resulting from the use of such apparatus are more homogeneous and are not subject to coming apart as in the prior technique.

Further features and advantages of the invention will be apparent from the description below.

The invention is herein described, somewhat diagrammatically and by way of example only, with reference to the accompanying drawings, wherein:

FIG. 1 illustrates a plaited loaf or bun adapted to be produced by using the apparatus of the present invention;

FIG. 2 is a side elevational view of one form of apparatus constructed in accordance with the invention;

FIG. 3 is a top plan view of the apparatus of FIG. 2;

FIGS. 4 and 5 are side and bottom plan views, respectively, of the forming members in the apparatus of FIGS. 2 and 3;

FIG. 6 is a side elevational view of another form of apparatus constructed in accordance with the invention; and FIG. 7 illustrates a variation in the shape of the forming members of FIGS. 4 and 5.

DESCRIPTION OF THE PREFERRED EMBODIMENTS

FIG. 1 illustrates the type of plaited loaf or bun 2 to be produced by the use of the present invention. As indicated earlier, this article had been produced by preparing an elongated strip of the dough and then bending it while giving it a twist, or by twisting two separate strips. When so produced, however, the skin of the elongated strip tended to harden before the twisting, so that after it was twisted and baked, it tended to fall apart at the joined skin surfaces.

The present invention provides an apparatus for producing the plaited loaf or bun 2 of FIG. 1 in a more efficient manner.

FIGS. 2-5 illustrate one form of apparatus constructed in accordance with the invention. This form includes a table 4 for receiving the lumps of dough before they are baked into loaves or buns. Overlying table 4 is a forming device, generally designated 6, which forms the lumps of dough for producing or simulating the plaits before they are baked.

Forming device 6 comprises a gallows-like structure 8 which is topped by an obliquely extending bridge 10 which bridge supports a pneumatic cylinder 12. Within cylinder 12 is a piston having a rod 14 carrying a plate 16 on its lower end. Plate 16 in turn carries a plurality of profiled forming members 18 which are adapted to cut into the surface of the dough to form the simulated plaits.

Piston rod 14, and the profiled forming members 18 carried thereby, are advanced downwardly towards the dough on table 4 and retracted upwardly away from the table by the control of the air supplied to cylinder 12 through inlet tube 20. This is controlled by valve VI (FIG. 3) as will be described more fully below.

Table 4 supports a second cylinder 22 having a piston rod 24 carrying a pusher plate 26 at its end, for ejecting the formed dough from underneath the forming device 6. The actuation of pusher plate 26 is controlled by a valve V2 (FIG. 2) which controls the air applied to cylinder 22 through air inlet tube 28.

Table 4 includes an extension 4a on one lateral side of the forming station, i.e. the area underlying the forming device 6. Table extension 4a is adapted to receive the pans or trays 30 on which the lumps of dough are placed. These pans are then pushed in the direction of arrow "a" toward the forming station, and abut a plate 32 on the opposite side of the forming station. Plate 32, when contacted by the dough forms 30, actuates valve VI, which controls cylinder 12 to advance downwardly the profiled forming members 18 onto the dough to produce the simulated plaits, and then to retract or return the forming members. When the forming members have been returned, plate 16 carried at the lower end of piston rod 14 actuates the second valve V2 which controls cylinder 22 to cause its pusher plate 26 to eject the pan carrying the formed dough from underneath the forming device.

FIG. 6 illustrates an apparatus including automatic loading, rather than manual loading. In the apparatus of FIG. 6, the table 4 supports a band conveyor 40, of which only the upper run is shown. The drive for conveyor 40 is schematically shown by motor M. The pans containing the lumps of dough are loaded onto the conveyor and are brought to the forming station underlying the forming device 6 including its cylinder 12 which advances and retracts the profiled forming members 18.

In the FIG. 6 embodiment, the back-up plate 32 is omitted and the forward extension 4a of the table is not necessary since the dough pans are conveyed by the conveyor 40. For controlling the conveyor and the forming device, the conveyor 40 includes a plurality of spaced abutments 42 which are adapted to engage a switch SW1 fixed in the path of movement of the conveyor band. Switch SW1 controls a control circuit schematically shown by block 44 which terminates the operation of motor drive M. In addition, control circuit 44 controls valve V1' controlling the air inlet into cylinder 12 to cause the profile forming members 18 to be advanced downwardly towards and against the dough in the pans, and then to be withdrawn or retracted upwardly. When the forms 18 are retracted upwardly, plate 16 which carried these forms actuates another switch SW2, which starts motor M, and thereby initiates another cycle of operation to bring another dough pan to the forming station under forming device 6.

It will be appreciated that instead of using pneumatic cylinders, hydraulic cylinders, electric motors, or solenoids could also be used. The profiled forming members 18 may have any other appropriate shape adapted to impart the desired appearance to the lumps of dough. FIG. 7 illustrates at 18' another shape that may be used. Where necessary or advisable because of the nature of the dough, the profiled forming members may have electrical resistances in their interior to heat the members. Desirably, profiled members 18, including plate 16, are removably attached to the bottom end of the piston rod 14 so as to enable other members to be substituted in a convenient manner.

What is claimed is:

1. In apparatus for producing bread loaves and buns having a plaited appearance, a table for receiving a lump of dough before it is baked into a loaf or bun, and a forming device overlying said table, said forming device comprising a plurality of forming members for simulating plaits on said lump of dough, advancing means for advancing the forming members towards the table to cut the upper surface of the lump of dough on the table to simulate plaits, and retracting means for retracting the forming members away from the table to permit another lump of dough to be received under the forming device.

2. Apparatus according to claim 1, further including a plurality of pans on said table each receiving a lump of dough, said forming members being profiled members and engaging all said lumps of dough simultaneously to form the simulated plaits thereon.

3. Apparatus according to claim 2, wherein said advancing and retracting means comprises a fluid cylinder and a piston movable therein, said forming members being carried by said piston.

4. Apparatus according to claim 3, wherein said table includes an extension on one side of the forming device for receiving the pans carrying the lumps of dough to be formed, a plate on the opposite side of the forming device, and a valve controlled by said plate, when said pans carrying the lumps of dough are brought against same, to actuate said fluid cylinder and piston.

5. Apparatus accoridng to claim 3, further including a second fluid cylinder and piston, the latter including a pusher plate for ejecting the formed dough from underneath the forming device, and a second valve controlled by said forming device upon its retraction to actuate said second cylinder and piston.

6. Apparatus according to claim 1, further including a conveyor and a drive therefor continuously conveying the lumps of dough to underlie the forming device, and control means for automatically terminating the operation of the drive when at least one lump of dough has been placed under the forming device, for actuating said forming device, and for reinitiating operation of the conveyor drive to bring another lump of dough underneath the forming device.

7. Apparatus according to claim 6, wherein said control means comprises a switch in the path of travel of the conveyor, a plurality of spaced abutments carried by said conveyor to engage said switch one after the other, a control circuit controlled by said switch, said control circuit including means terminating operation of the conveyor drive when the switch is actuated, a valve controlled by said control circuit to actuate the forming device, and a second switch actuated by said forming device when returned to its retracted position to reinitiate operation of the conveyor drive.

* * * * *